United States Patent [19]
Wilkins, Jr.

[11] Patent Number: 6,142,437
[45] Date of Patent: Nov. 7, 2000

[54] VIDEO CAMERA AND UMBRELLA SUPPORTS FOR GOLF CARS, GOLF PULL CARTS AND GOLF CARRY BAGS

[76] Inventor: Guy Wilkins, Jr., 1719 Binford St., Ogden, Utah 84401

[21] Appl. No.: 09/235,585

[22] Filed: Jan. 22, 1999

Related U.S. Application Data

[60] Provisional application No. 60/073,757, Feb. 5, 1998.

[51] Int. Cl.[7] .................................................. A47B 96/06
[52] U.S. Cl. ................... 248/231.71; 248/511; 248/514; 248/228.6; 248/230.6; 248/520; 248/534
[58] Field of Search ............................... 248/187.1, 511, 248/514, 228.6, 230.6, 520, 534

[56] References Cited

U.S. PATENT DOCUMENTS

| | | | |
|---|---|---|---|
| 2,650,788 | 9/1953 | Hulstein | 248/231.71 X |
| 3,304,036 | 2/1967 | Davis | 248/534 |
| 4,334,692 | 6/1982 | Lynch | 280/79.1 A |
| 4,526,308 | 7/1985 | Dovey | 224/265 |
| 4,570,894 | 2/1986 | Miele | 248/534 |
| 4,615,597 | 10/1986 | Burriss | 248/183 X |
| 4,711,422 | 12/1987 | Ibanez | 248/515 |
| 4,720,074 | 1/1988 | Gard et al. | 248/514 |
| 4,887,786 | 12/1989 | Stokes | 248/512 |
| 5,265,839 | 11/1993 | Buckley | 248/538 |
| 5,431,364 | 7/1995 | Etter | 248/514 |
| 5,497,214 | 3/1996 | Labree | 248/187.1 X |
| 5,538,212 | 7/1996 | Kennedy | 248/215 |
| 5,664,750 | 9/1997 | Cohen | 248/231.71 |

*Primary Examiner*—Ramon O. Ramirez
*Assistant Examiner*—A. Joseph Wujciak, III
*Attorney, Agent, or Firm*—Daniel McCarthy

[57] ABSTRACT

Various video camera supports for use in taping the swing of a golfer during real golf play are disclosed. The supports may be attached to a golf bag, a riding golf car, or used with a hand-pulled golf car. The supports may be modified to support an umbrella as well, or separate umbrella supports that accommodate using an umbrella during golf play are provided.

4 Claims, 6 Drawing Sheets

VIDEO CAMERA AND UMBRELLA SUPPORTS FOR GOLF CARS, GOLF PULL CARTS AND GOLF CARRY BAGS

PRIORITY

This application claims priority to provisional patent application Ser. No. 60/073,757 filed on Feb. 5, 1998.

BACKGROUND OF THE INVENTION

A. The field of the invention

This invention relates the field of devices to help train golfers swings by providing an easy, quick to use system for supporting a video camera to take pictures of the golfers swing at practice or during actual play without a second person holding the camera and without interfering with the pace of play on the course. The support devices are also adapted to holding a support receptacle to receive the handle of an umbrella.

B. The Background Art

In the prior art, video camera support devices were not securely mounted to eliminate potential camera damage on riding golf cars or were designed to be located in difficult locations for operation and alignment. For use of Golfers with pull carts or shoulder strap carry bags, the only video training method was for a second person to hand hold the camera. For the umbrella support adaptation of the video camera support, the prior art consists of an umbrella support fastened well out on the pull cart handle, making the cart easy to tip over. For the carry bag the golfer just laid his umbrella on the ground.

SUMMARY OF THE INVENTION

It is an object of the invention to provide a device that will allow a golfer to make video tapes of his swing without any outside assistance by some other person holding the camera. It is a further object of the invention that this device be simple to use and quick enough to be quickly set up and aligned, light enough in weight to permit attaching to a golf carry bag and be carried on the golfers shoulder or placed on a pull cart; either personal or a rental cart at a golf course. It is a further object of the inventions to provide a steady, secure support for the camera that will provide quality pictures, detailed enough for review by a golf professional to coach the golfer in his swing training. It is a further object of the invention to provide a support for an umbrella.

BRIEF DESCRIPTION OF THE DRAWINGS

FIG. 3A also depicts the camera support device shown in FIG. 1A mounted on a front roof support of a riding golf car.

DETAILED DESCRIPTION OF THE PREFERRED EMBODIMENT

The invention provides a system of camera supports to enable an individual golfer to video tape his golf swing on the practice tee or while actually playing on the golf course, without another person holding the camera, or without holding up the pace of play on the course. The camera supports also allows the golf professional to send his students out on the course alone and to analyze the swing performance of the student without the professional having to be present during golf play. A series of video tapes of the golfer's swing can be used to build up a library and record the golfer's progress over time.

Figure 1A:
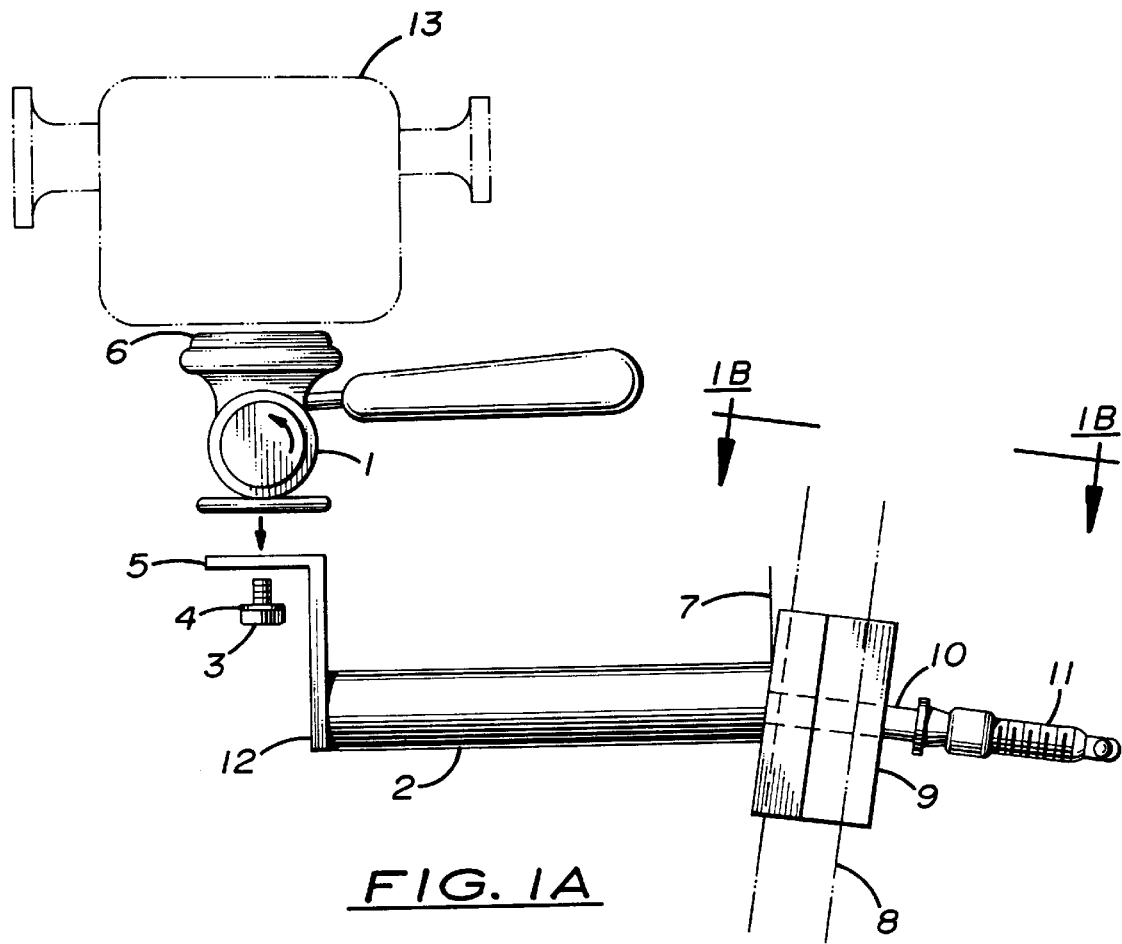
FIG. 1A depicts a side view of the support device to attach by a clamp to the roof support of a riding golf car with a commercially available camera tripod head bolted to the support device.

Referring to FIG. 1A, one embodiment of the invention is shown. The embodiment is a mounting assembly or bracket 12 intended to receive a commercially available camera tripod head 1, equipped with a quick detach plate 6, which is attached to the video camera 13 typically with a screw. The tripod head 1 is typically bolted with a bolt 3 and a lock washer 4 to a formed structural angle 5 or other tripod head receiver at one end (the proximal end) of the bracket arm 2. At the other or distal end of the bracket arm 2 is an open sided formed structural channel 9 with a clamp 10 to clamp the bracket to one roof support 8 of the riding golf car by turning the clamp screw 11. The angle 7 between the bracket arm 2 and the open sided structural channel 9 may be varied to match the slope of the roof support of various golf car makes or may be set at 90 degrees if to be used on the rear roof support 8 of any golf car such as that shown on FIG. 3B. The tripod head is preferably equipped with a quick release plate 6 which is in turn bolted to the camera. The bracket comprising the support device may be set at different angles depending on the manufacturer of the golf car. The bracket can also be adapted with an adjustable angle for use with any golf car.

Figure 1B:
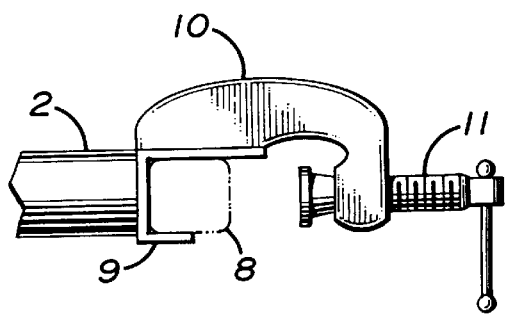
FIG. 1B depicts a top view of the clamp utilized in FIG. 1A.

Referring to FIG. 1B a top view of the clamp 10 is shown. The clamp body 10 is preferably welded to the open sided structural channel 9, which is also preferably welded to the bracket arm 2. With the clamp screw 11 open, the open sided channel may be slipped over the golf car roof support 8 and the clamp screw 11 may be tightened.

Figures 2A, 2B, 2C:
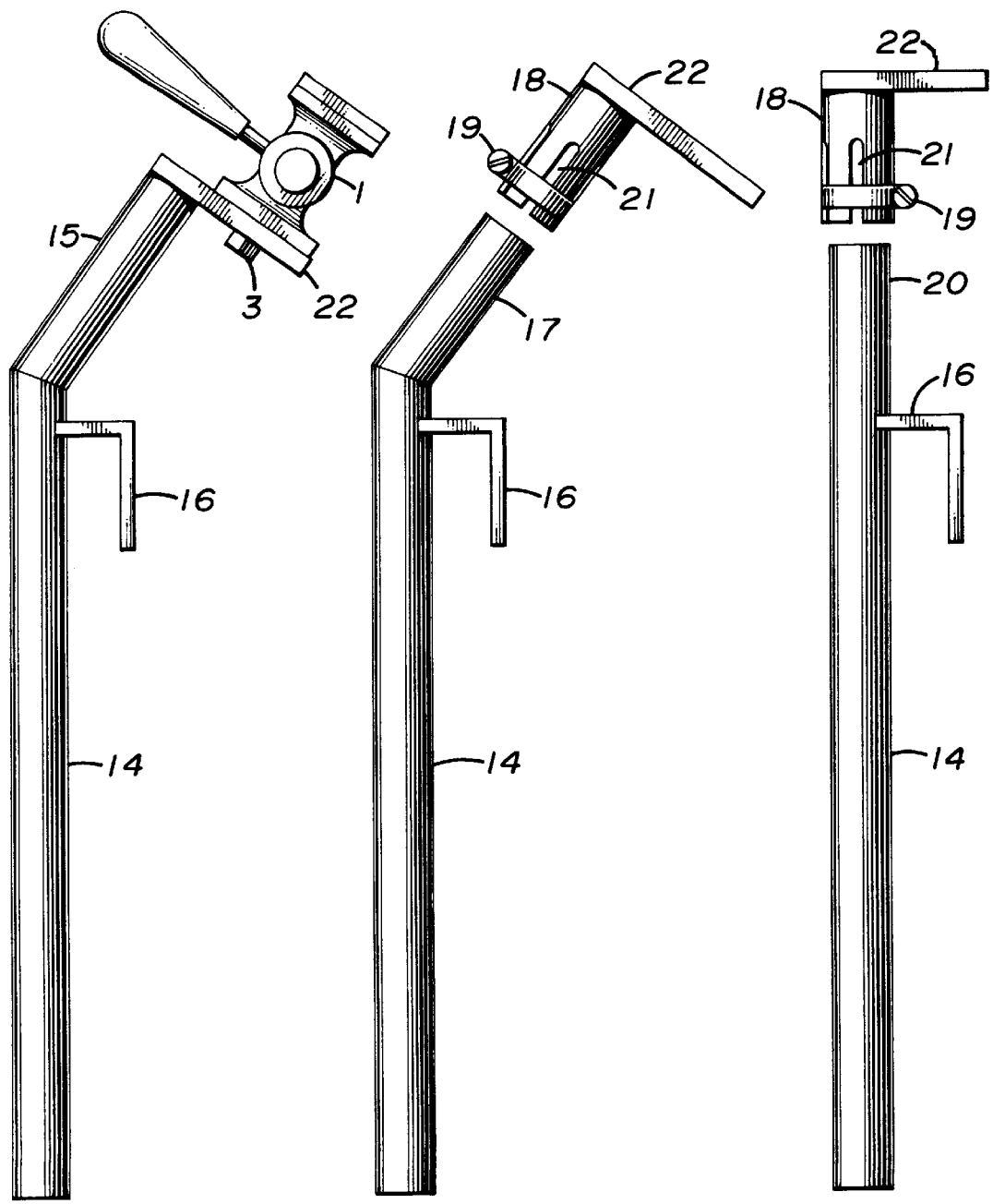
FIG. 2A depicts the camera support device with a top plate having a hole for bolting a commercially available camera tripod head to mount a video camera on a shoulder strap golf carry bag whether carried on the shoulder or mounted on a hand pull cart.
FIG. 2B depicts the camera support device, with a detachable clamped upper piece with a flat plate having a hole for bolting a commercially available camera tripod head to mount a video camera on a shoulder strap golf carry bag whether carried on the shoulder or mounted on a hand pull cart. With the upper piece removed the device can be used to mount an umbrella support, depicted in FIG. 5B.
FIG. 2C depicts the camera support device with a detachable clamped upper piece with a flat plate having a hole for bolting a commercially available camera tripod head to support a video camera on a golf bag mounted on the bag compartment of a riding golf car.

Referring to FIG. 2A another embodiment of the invention is shown. This embodiment includes a long tube 14 to be slipped down into a golf bag and secured by sliding the angle clip 16 over the top edge of the golf bag. At the top end of the tube 14, the upper section of the tube 15 is set at an angle to the main tube 14. A plate 22 is preferably welded to the top of tube 15, and a camera tripod head 1 may be secured to the plate 22 with bolt 3.

Referring to FIG. 2B, another embodiment of the invention is shown. It includes a long tube 14 to be slipped down into a golf bag and secured by sliding the angle clip 16 over the top edge of the golf bag. At the top end of the tube 14, a second tube 17 is attached at a desired angle. A plate 22, to which a camera tripod head may be attached for mounting a camera, is welded to the top of a detachable mount 18. The mount 18 includes a clamp 19 configured similar to a hose clamp for attaching the mount 18 to the tube 17. The mount 18 is a tube, whose diameter is slightly larger than the outside diameter of the tube 17. There are slits on the bottom of the tube 18 to permit clamping of tube 18 onto tube 17 with a clamp 19. With the detachable mount 18 and the plate 22 removed, this embodiment can be used to mount an umbrella support 27 as shown in FIG. 5B and FIG. 6. The bottom end of the tube 27 is the same diameter and slit the same as the mount 18 and sips down over the tope of the tube 17 and is clamped with the clamp 19.

Referring to FIG. 2C, another embodiment of the invention is shown. This embodiment includes a long tube 14 to be slipped down into a golf bag and secured by sliding an angle clip 16 over the top edge of the golf bag. The upper section of the tube 14 is straight 20 onto which is slipped a detachable mount 18. A plate 22, to which a camera tripod head may be attached for mounting a camera, is welded to the top of the detachable mount 18. The mount 18 is a tube whose inside diameter is slightly larger than the outside diameter of the tube 17. There are slits in the bottom of the tube 18 to provide for clamping tube 18 onto tube 17 with a clamp 19. With the detachable mount 18 and the plate 22 removed, this embodiment can be used to mount and umbrella support 27 as shown in FIG. 5B. The bottom end of the tube 27 is the same diameter and slit the same as the mount 18 and slips down over the top of the tube 17 and is clamped with the clamp 19. This embodiment of the invention is suggested for use where the golf bag will be mounted on the rear of a riding golf car as shown on FIG. 3A.

Figure 3A:
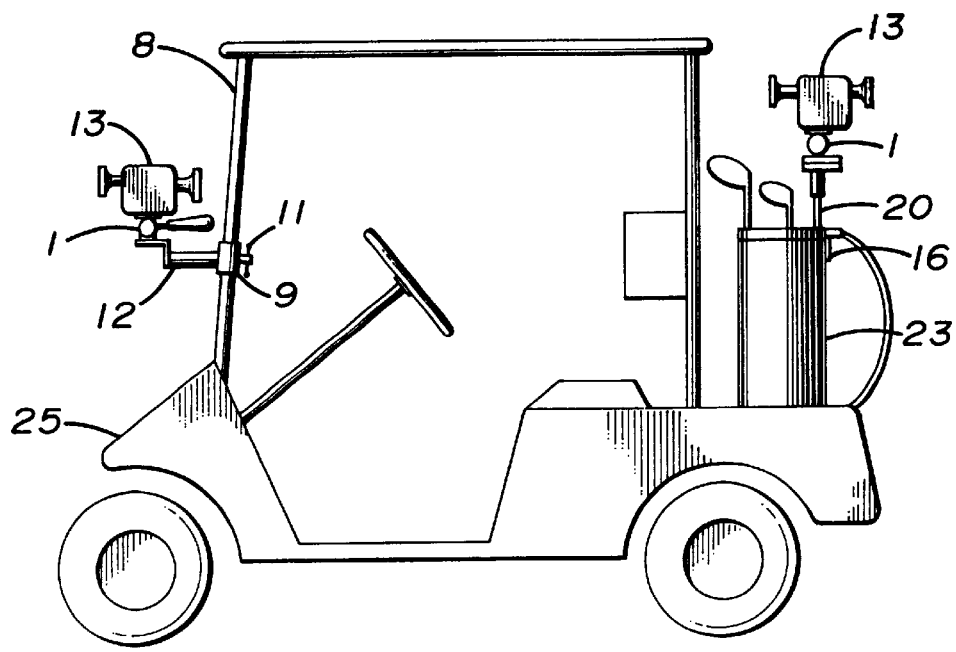
FIG. 3A depicts the camera support device shown in FIG. 2C mounted on a shoulder carry golf bag which has been strapped into the bag compartment of a riding golf car.

Referring to FIG. 3A, two embodiments of the camera supports are shown in use on a riding golf car 25. A camera support 12 on which is mounted a tripod head 1 with a camera 13, attached as shown in FIG. 1A is mounted on a front roof support 8 by use the open sided structural channel 9 and clamp screw 11. A camera support, as shown in FIG. 2C, for use with a shoulder strap carry golf bag 20, with tripod head 1 and camera 13 mounted and attached to the bag 23 with the clip 16 is depicted in use with the bag 23 mounted on the rear of a golf car 25.

Figure 3B:
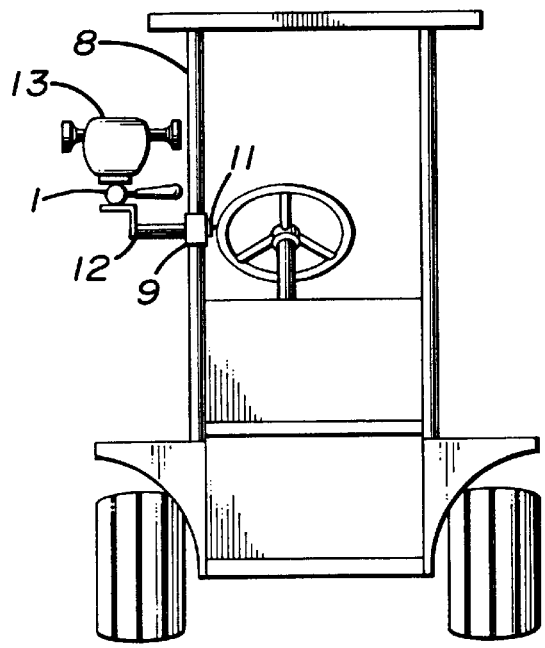
FIG. 3B depicts the camera support device shown in FIG. 1A mounted on a rear roof support of a riding golf car.

Referring to FIG. 3B, another embodiment of the invention is shown with the camera support 24, holding tripod head 1 and camera 13, mounted on a rear roof support 8 by the use of an open sided structural channel 9 and clamp screw 11. The camera support 24 is the same as depicted in FIG. 1A.

Figure 4:
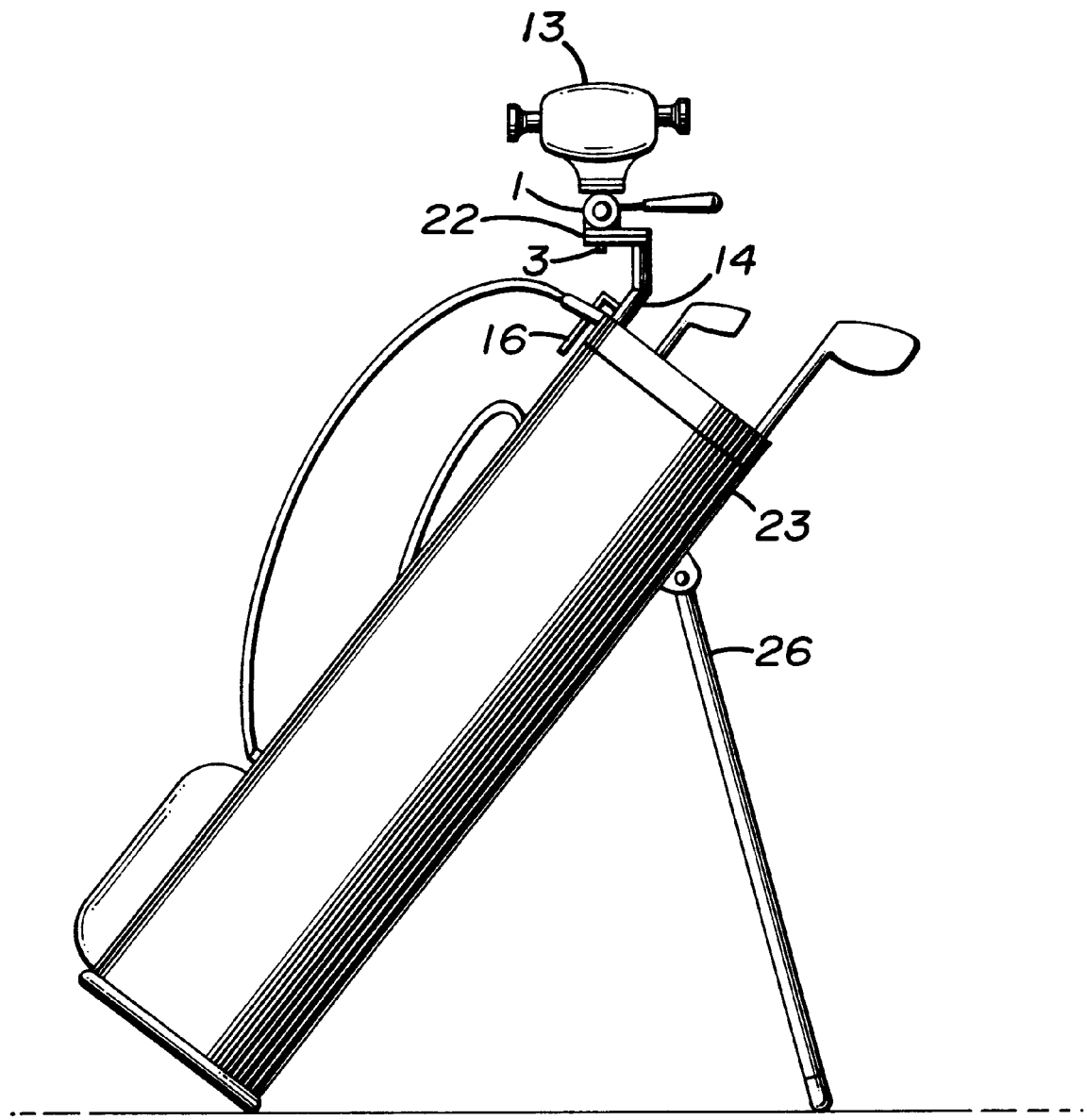
FIG. 4 depicts the camera with the support device mounted on a shoulder strap carry bag equipped with jack stands.

Referring to FIG. 4, another embodiment of the invention is shown. This embodiment of the camera support is the same as depicted in FIG. 2A and is suggested for use with a shoulder strap carry golf bag 23. As shown, the long tube 14 has been slipped down into the carry bag 23 and attached with the clip 16 and a camera tripod head 1, holding a camera 13, has been mounted on top of the plate 22 attached with a bolt 3. The carry golf bag is depicted sitting on jack stands 26.

Referring to FIG. 5A one embodiment of the invented umbrella support is shown. The umbrella support includes an elongate tube 26 that has an angled or offset lower section. The support includes an enlarged upper section 32 as a receptacle that has a solid bottom into which the umbrella handle 31 (shown in cut-away) may be inserted. The support includes a tube 26 with slits 21 and a clamp 19 so that it may be slipped down on the main frame tube of a hand pulled golf cart or a camera support and clamped thereto.

Referring to FIG. 5B, another embodiment of an umbrella support 27 is shown. The support includes a tube 27 with an enlarged upper section 32 as a receptacle that has a solid bottom 33 into which an umbrella handle 31 may be inserted. The tube 27 has slits 21 and a clamp 19 for attachment to a camera support device, with the detachable camera mount removed as shown in FIG. 2B, for use with a shoulder strap carry golf bag as shown in FIG. 6 when mounted on a hand-pulled golf cart.

Referring to FIG. 5C, another embodiment of the invention is shown. It includes an enlarged tubular section 32 having a solid bottom 33 to receive an umbrella handle. The bottom 33 has a threaded rod 28 with a lock washer 29 and nut 30 to be bolted to a riding golf car camera support bracket 24, such as that shown in FIG. 3B with the tripod head and camera removed.

Referring to FIG. 6, another embodiment of the camera support 17 with the detachable camera support removed is shown, with the umbrella support 27 slipped onto the camera support 17 and clamped with the clamp 19, and with the camera support 17 slipped down into the shoulder strap carry golf bag 23 mounted on a hand pulled cart 35 and secured with the clip 16. The umbrella 34 handle 31 has been slipped down into the enlarged section 32 (receptacle) of the umbrella support 27.

There are several important features of these camera support systems. First the camera and its support may be fixed to the equipment traveling with the golfer. The golfer does not need to carry the camera support in his hand or touch it until arriving at the next shot location, where with just a little practice the golfer can park the golf car in an appropriate location so that the amount of aiming of the camera is minimized and only a few seconds are required to aim and turn on the camera. The umbrella support is similar. When the golfer is traveling with a golf car or bag, then if the umbrella is no longer needed it can be stowed and its support left in place until the round of golf is completed.

Second, a camera tripod head (although not part of the invention, only in its utilization) is equipped with a quick release plate that is attached to the bottom of the camera with a screw. This release plate is clipped to the tripod head, holding the camera in place, and releases the camera with the flip of a lever so the camera can be temporarily stowed and be restored to use in a matter of seconds. The tripod head has two directional rotation for easy aiming and is locked in position by two screw handles operated by the left and right hand at the same time.

Third, the features listed above are important when the equipment is used on the golf course so that there is no interference with the pace of play and so that there is no distraction of the golfer who is concentrating on the critical aspects of the swing and the changes being made in the swing.

Golfers who seriously try to improve their skill can benefit greatly by being able to see their swing on a video tape. A tape allows them to analyze their swing alone or with an instructor, including slowing the swing down with stop action to freeze points. This ability is now available in golf teaching studios and on the golf course with another person holding the camera. The present invention provides equipment that will allow the individual golfer to video record his swing on a driving range and on a golf course, alone or with a group of other golfers, without assistance and without anyone holding the camera for him. The golfer can then review the video of his real playing golf swing on his own or with his teaching professional.

A golfer's practice swing does not look like a real swing during play. Therefore, suggestions made by an instructor during golf practice may not be applicable to the golfer's true swing during play. Major improvements in a golfer's performance are possible if the golfer can see what his real swing looks like. With the invented camera support attached to a riding golf car, pull cart or carry bag, a video camera can be quickly put into position on arriving at the shot location or tee box. The camera tripod head, with two direction pivoting, allows the camera to be quickly aligned and for taping to begin.

Once the camera is aligned, it should be turned on and will remain running while the golfer prepares for his swing and hits a shot. The camera is then turned off and the golfer moves on down the course.

With the camera supports of the invention, or as a separate product, umbrella supports are provided for the convenience of the golfer during rain. It is a natural extension of the camera support invention to provide adaptations that allow the golfer a place to store his umbrella while hitting the ball on the golf course. With the umbrella support mounted on a riding golf car, the golfer can secure one or more dry towels and one or more dry golf gloves inside of the umbrella. When the golfer arrives at his shot location he can dry his hands on the towel up inside the umbrella, take out a club and dry the grip, put on a dry glove, removes the umbrella from the support and walk to the shot location with the umbrella over his shoulder, lay the open umbrella on the ground (positioned so that the towels and gloves stay dry), hit his shot and return to the golf car with the umbrella over his shoulder. By driving reasonably slow the umbrella can be left open to help protect the top of the golf bag. If the weather is too windy the umbrella may be snapped shut but can remain in the invented umbrella support.

Figure 5:
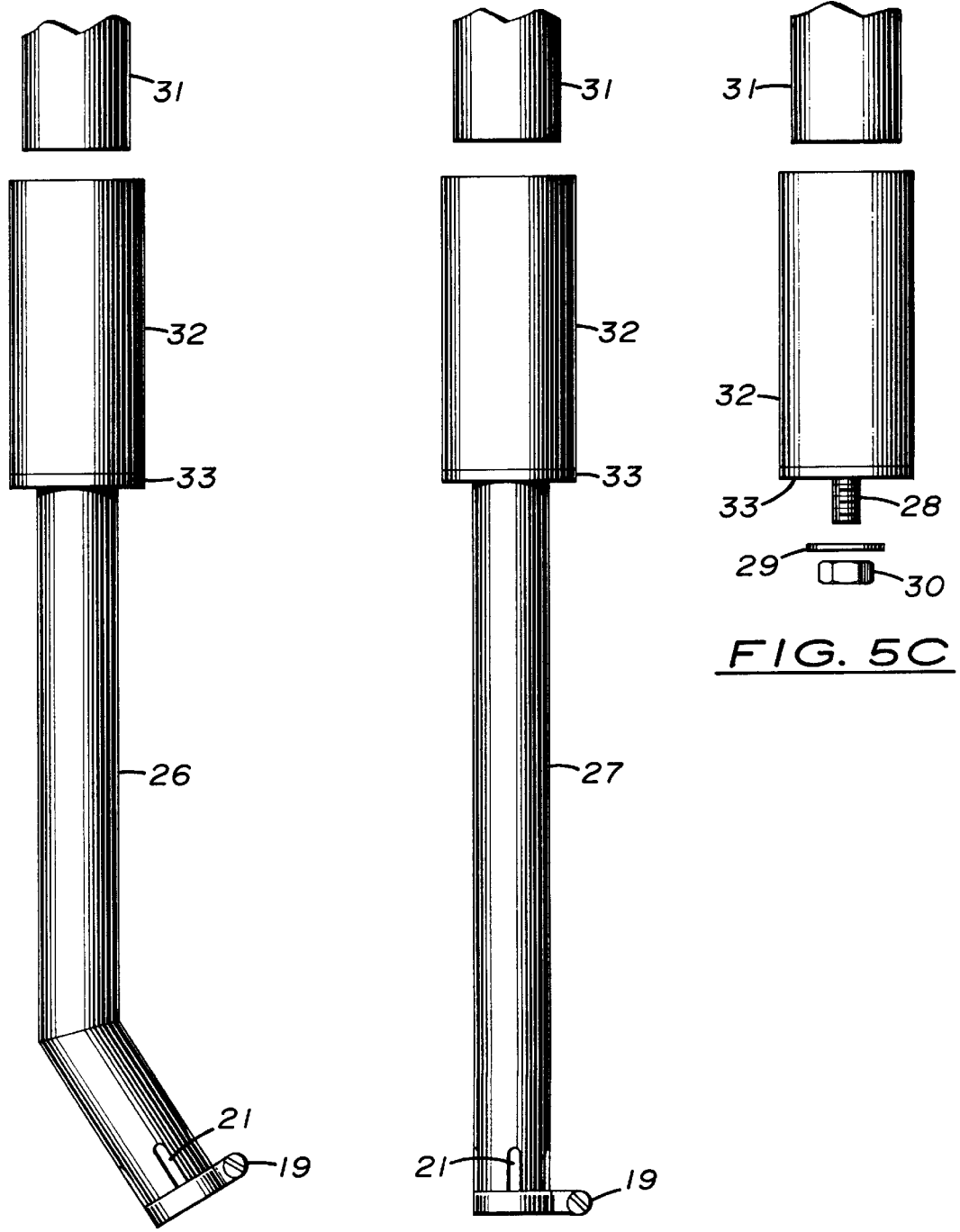
FIG. 5A depicts an umbrella support for mounting on the main frame tube of a hand-pulled golf cart.
FIG. 5B depicts an umbrella support for mounting on the camera support tube such as that shown in FIG. 2B with the detachable upper piece removed and mounted on a shoulder strap carry golf bag to be either carried on the shoulder of the golfer or on a hand pull cart.
FIG. 5C depicts the umbrella support to be bolted to the camera support device, such as that shown in FIG. 1A, in place of the camera tripod head and mounted on a riding golf car located as shown on FIG. 3B.
Figure 6:
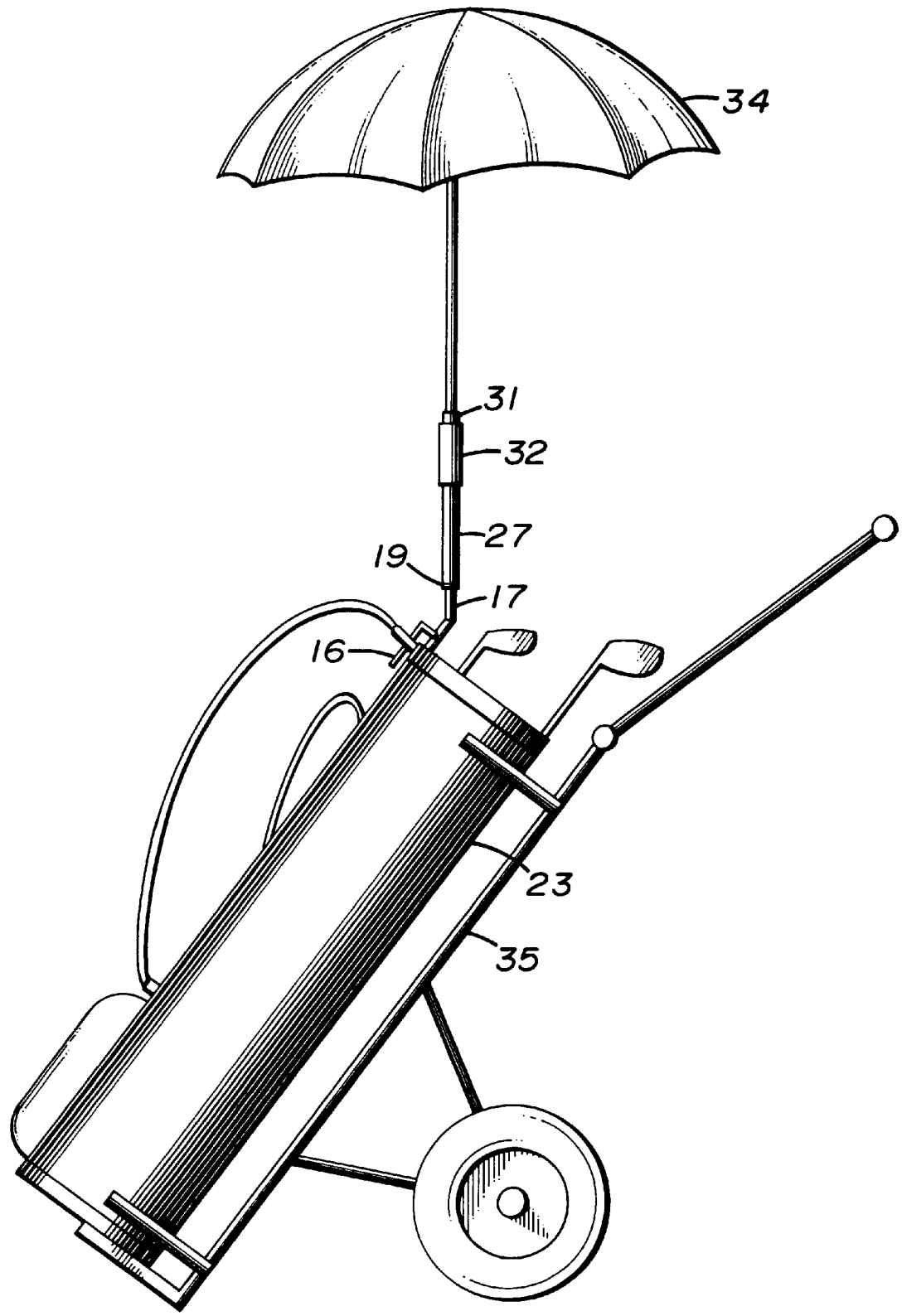
FIG. 6 depicts an umbrella support, such as that shown in FIG. 5B, slipped down on the camera support tube shown in FIG. 2B with the detachable upper piece removed and mounted on a shoulder strap golf carry bag that is mounted on a hand pull cart.

Adaptations of the invention are provided for using umbrella supports mounted on the basic camera supports shown in FIGS. 5 and 6. With either the carry bag on his shoulder or on a hand pulled cart the golfer walks the course with the umbrella, complete with towels and gloves up inside, on his shoulder. Upon arriving at the shot location or tee box, the umbrella is placed in the support, the hands and grip are dried and a dry glove put on. The golfer steps out from under the umbrella and hits the shot, replaces the umbrella and moves on down the course. This equipment allows a golfer, playing in the rain, to stay as dry as he could if he had a caddy to hold the umbrella for him.

While the present invention has been described and illustrated in conjunction with a number of specific embodiments, those skilled in the art will appreciate that variations and modifications may be made without departing from the principles of the invention as herein illustrated, described and claimed.

The present invention may be embodied in other specific forms without departing from its spirit or essential characteristics. The described embodiments are to be considered in all respects as only illustrative and not restrictive. The scope of the invention is indicated by the appended claims rather than the foregoing description. All changes which come within the meaning and range of equivalency of the claims are to be embraced within their scope.

I claim:

1. A camera support for supporting a camera on a golf bag so that the camera is capable of recording golf swings, the camera support comprising:

(a) a first elongate member adapted to placement within a golf bag, said first elongate member having a first end and a second end and a longitudinal axis therebetween, said second end being locatable a substantial distance within said golf bag in order to achieve stable placement of the camera support, (b) a clip located at said first end of said first elongate member, said clip being dimensioned and positionable to rest on an upper edge of a golf bag and to thereby maintain the camera support and the camera adapted to be located thereon in a generally fixed position with respect to the golf bag, (c) a second elongate member, said second elongate member having a first end and a second end and a longitudinal axis therebetween, said second elongate member second end being joined with said first elongate member first end, and said longitudinal axis of said second elongate member being oriented with respect to said longitudinal axis of said first elongate member at an angle other than 180 degrees, (d) a tripod head mounting plate located at said second elongate member second end, said tripod head mounting plate being adapted to have a camera tripod head mounted thereon.

2. A camera support for supporting a camera on a golf bag so that the camera is capable of recording golf swings, the camera support comprising:

(a) an elongate member having a first end and a second end and a longitudinal axis therebetween, said elongate member first end being adapted to be placed in a golf bag so that said second end is locatable deep within the golf bag in order to achieve stability of the camera support, (b) a clip located on said elongate member closer to said elongate member second end than to said elongate member firs end, said clip being dimensioned and positioned to rest on an upper edge of a golf bag and to thereby maintain the camera support and any camera located thereon in a generally fixed position with respect to the golf bag, (c) a detachable mount attachable to and detachable from said elongate member second end, (d) a camera tripod head mounting plate located on said detachable mount, said tripod head mounting plate being adapted to have a camera tripod head mounted thereon.

3. A camera support as recited in claim 2 further comprising clamp means for securing said mount to said elongate member.

4. A camera support as recited in claim 2 further comprising at least one slit located on said detachable mount to provide for clamping said mount to said elongate member second end.

* * * * *